US012205743B2

(12) United States Patent
Lin

(10) Patent No.: US 12,205,743 B2
(45) Date of Patent: Jan. 21, 2025

(54) MODULARIZED TRANSFORMER HAVING A SECONDARY SIDE WITH A LARGE CURRENT STRUCTURE

(71) Applicant: Hsun-I Lin, Tainan (TW)

(72) Inventor: Hsun-I Lin, Tainan (TW)

( * ) Notice: Subject to any disclaimer, the term of this patent is extended or adjusted under 35 U.S.C. 154(b) by 639 days.

(21) Appl. No.: 17/571,648

(22) Filed: Jan. 10, 2022

(65) Prior Publication Data

US 2023/0223179 A1 Jul. 13, 2023

(51) Int. Cl.
*H01F 27/06* (2006.01)
*H01F 27/02* (2006.01)
*H01F 27/245* (2006.01)

(52) U.S. Cl.
CPC ........... *H01F 27/06* (2013.01); *H01F 27/022* (2013.01); *H01F 27/245* (2013.01)

(58) Field of Classification Search
CPC ............. H01F 27/06; H01F 2027/2857; H01F 27/2895
USPC .......................................... 336/65, 180, 186
See application file for complete search history.

(56) References Cited

U.S. PATENT DOCUMENTS 4,779,812 A * 10/1988 Fisher .................. H01F 41/022 242/434.7
4,833,437 A * 5/1989 Williamson ............ H01F 37/00 336/83
7,864,013 B2 * 1/2011 Muelleman ............. H01F 27/34 336/178
9,633,778 B2 * 4/2017 Shen ......................... H01F 3/10
10,431,377 B2 * 10/2019 Ishigaki .................. H01F 38/14
2007/0090916 A1 * 4/2007 Rao ....................... H01F 17/062 336/229
2015/0371763 A1 * 12/2015 Gordin ................ H01F 17/0013 336/225

* cited by examiner

*Primary Examiner* — Shawki S Ismail
(74) *Attorney, Agent, or Firm* — Chun-Ming Shih; LANWAY IPR SERVICES

(57) ABSTRACT

A modularized transformer includes an annular iron core, a first module encircling the annular iron core, a second module encircling the first module, a third module encircling the second module, a fourth module encircling the third module, and a primary-side power supply line mounted on the fourth module and encircling the annular iron core. Thus, the modularized transformer has a modularized structure and includes multiple modules that are extended and increased to amplify the voltage or current continuously and to regulate the voltage or current.

5 Claims, 5 Drawing Sheets

MODULARIZED TRANSFORMER HAVING A SECONDARY SIDE WITH A LARGE CURRENT STRUCTURE

BACKGROUND OF THE INVENTION

1. Field of the Invention

The present invention relates to a transformer and, more particularly, to a modularized transformer.

2. Description of the Related Art

A conventional DC transformer structure is mainly controlled by SCR (silicon controlled rectifier) or IGBT, which is used for a high-current DC power supply (for example, with output voltage of 1V-500V, and current of 1 A-50,000 A), or a high-frequency exchanging (or switching) DC rectifier. The conventional DC transformer is mainly used in a surface treatment (such as electroplating) or in an anodizing process, for example, a mobile phone shell, electroplating of PCB (printed circuit board), electroplating of IC conductive frame, continuous electroplating, metal screw electroplating, electrolysis, a charger, electro-coating, a direct current car or an electric car charger. The conventional DC transformer controlled by SCR or IGBT mainly includes an iron core, a primary-side winding, and a secondary-side winding. The iron core is made of silicon steel sheet material. The primary-side winding and the secondary-side winding are conductive metal material made of copper. However, the conventional DC transformer has to satisfy the requirement of a large current and a low voltage so that the iron and copper material has a high loss or wear. In addition, the conventional DC transformer has a low working efficiency, has a large volume, and wastes the electrical energy. Further, the conventional DC transformer produces a high temperature during the rectifying process of a large current and a low voltage so that it is necessary to provide a cooling device for carrying the heat. If the conventional DC transformer is cooled by a forced fan, a lot of noise is produced. If the conventional DC transformer is cooled by oil or water, pollution is produced, and the rectification efficiency is low.

BRIEF SUMMARY OF THE INVENTION

The primary objective of the present invention is to provide a modularized transformer having a secondary side with a large current structure.

In accordance with the present invention, there is provided a modularized transformer comprising an annular iron core, a first module encircling the annular iron core, a second module encircling the first module, a third module encircling the second module, a fourth module encircling the third module, and a primary-side power supply line mounted on the fourth module and encircling the annular iron core. The annular iron core is placed in the first module. The first module is placed in the second module. The first module is a conducting metal made of copper. The second module is placed in the third module. The second module is a conducting metal made of copper. The third module is placed in the fourth module. The third module is a conducting metal made of copper. The fourth module is a conducting metal made of copper. The primary-side power supply line is winding wire made of copper. An outer ring of the second module has a diameter more than that of an outer ring of the first module, and an inner ring of the second module has a diameter less than that of an inner ring of the first module. An outer ring of the third module has a diameter more than that of an outer ring of the second module, and an inner ring of the third module has a diameter less than that of an inner ring of the second module. An outer ring of the fourth module has a diameter more than that of an outer ring of the third module, and an inner ring of the fourth module has a diameter less than that of an inner ring of the third module.

According to the primary advantage of the present invention, the modularized transformer has a modularized structure and includes multiple modules that are extended and increased to amplify the voltage or current continuously and to regulate the voltage or current at the required value so as to satisfy the requirement of the industry.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
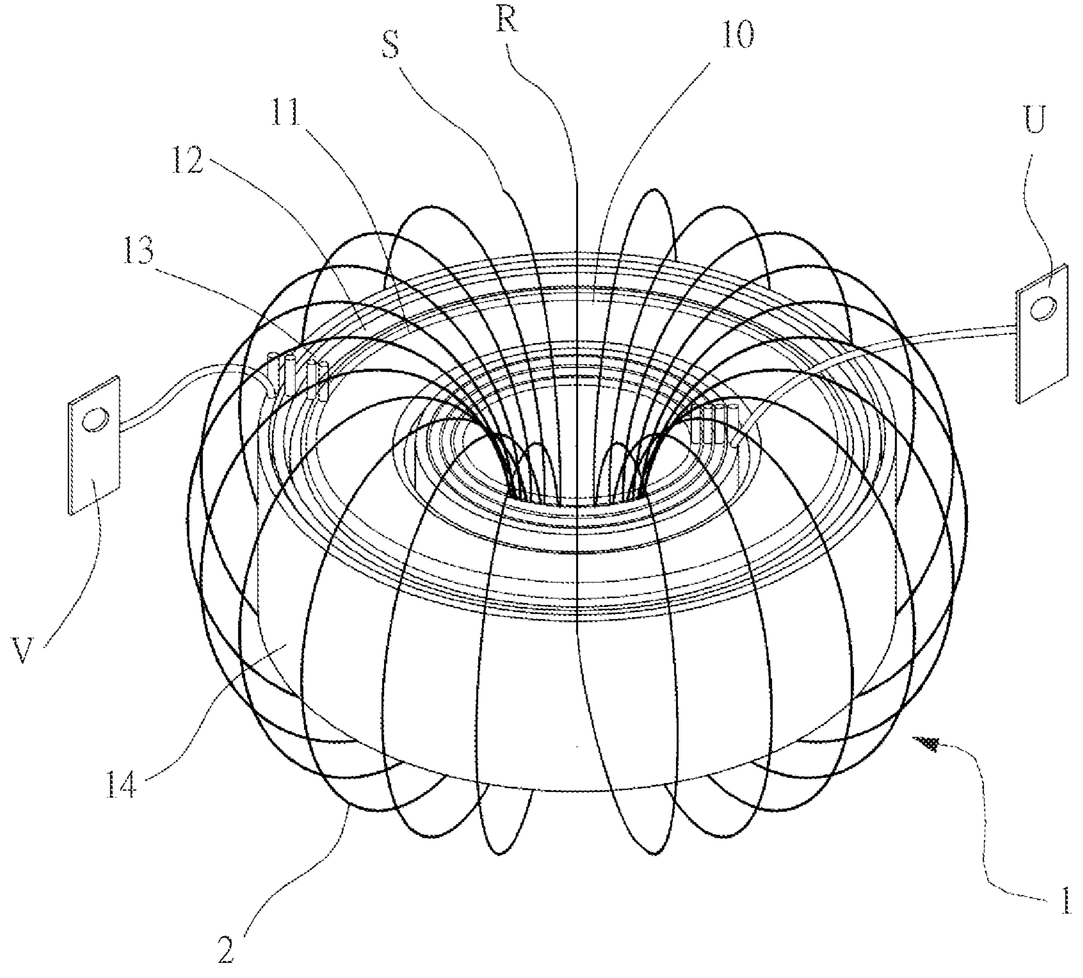
FIG. 1 is a perspective view of a modularized transformer in accordance with the preferred embodiment of the present invention.
Figure 2:
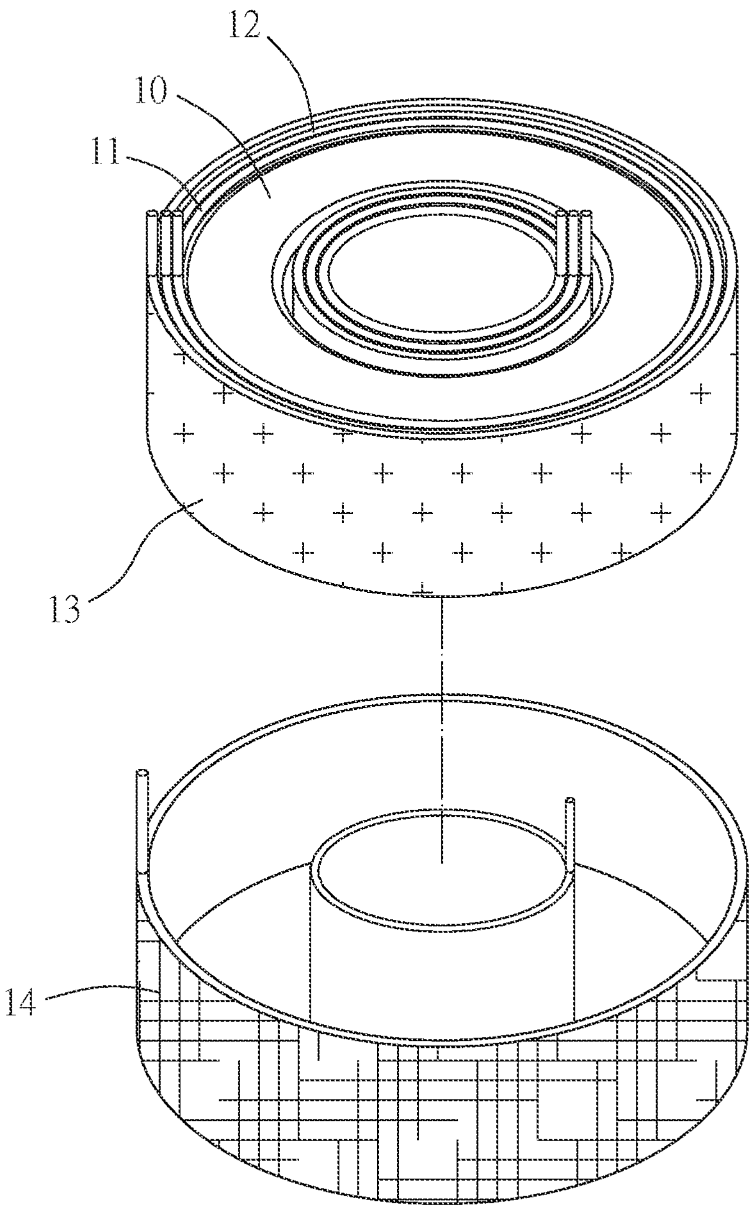
FIG. 2 is a partial exploded perspective view of the modularized transformer in accordance with the preferred embodiment of the present invention.
Figure 3:
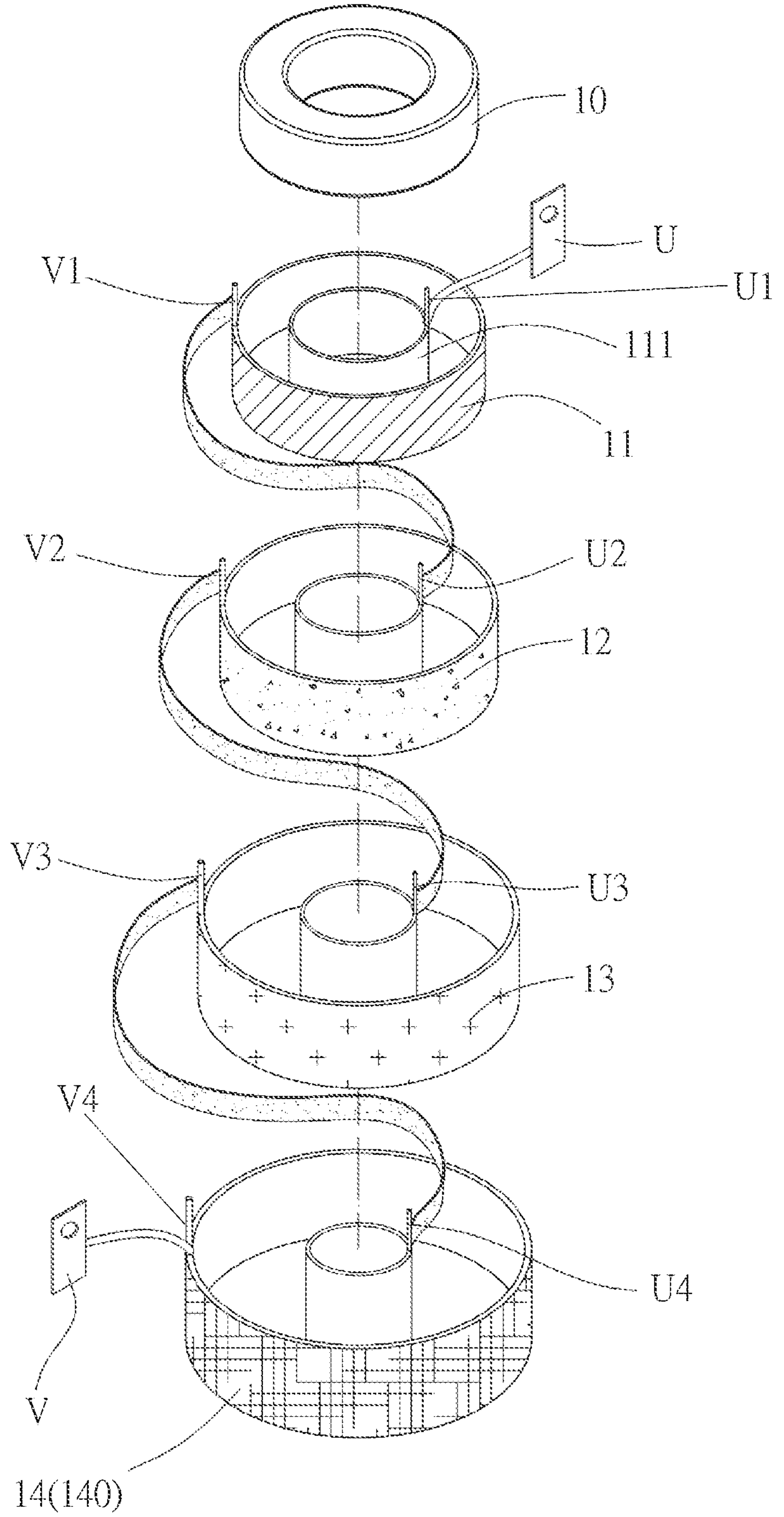
FIG. 3 is an exploded perspective view showing a series circuit of the modularized transformer in accordance with the preferred embodiment of the present invention.

Referring to the drawings and initially to FIGS. 1-3, a modularized transformer 1 in accordance with the preferred embodiment of the present invention comprises an annular iron core 10, a first module 11 encircling the annular iron core 10, a second module 12 encircling the first module 11, a third module 13 encircling the second module 12, a fourth module 14 encircling the third module 13, and a primary-side power supply line 2 mounted on the fourth module 14 and encircling the annular iron core 10.

The annular iron core 10 is placed in the first module 11. The first module 11 is placed in the second module 12. The first module 11 is a conducting metal made of copper and has an annular shape. The second module 12 is placed in the third module 13. The second module 12 is a conducting metal made of copper and has an annular shape. The third module 13 is placed in the fourth module 14. The third module 13 is a conducting metal made of copper and has an annular shape. The fourth module 14 is a conducting metal made of copper and has an annular shape.

In such a manner, the first module 11, the second module 12, the third module 13, and the fourth module 14 overlap each other layer by layer to construct four layers of conducting metal.

Similarly, multiple modules overlap each other to extend outward successively so that the modularized transformer has multiple layers of conducting metal to produce a high voltage or high current.

The primary-side power supply line 2 is a winding wire made of copper and has a first terminal R and a second terminal S connected to a power supply.

In practice, the primary-side power supply line 2 constructs a primary-side winding, while the first module 11, the second module 12, the third module 13, and the fourth module 14 constructs a secondary-side winding. Thus, the secondary-side winding cooperates with the primary-side winding to produce a secondary-side voltage and a secondary-side current. It is noted that, the primary-side winding is connected to a power supply to input the power, and the secondary-side winding is connected to a load to output the power.

In the preferred embodiment of the present invention, an outer ring of the second module 12 has a diameter more than that of an outer ring of the first module 11, and an inner ring of the second module 12 has a diameter less than that of an inner ring 111 of the first module 11. Similarly, an outer ring of the third module 13 has a diameter more than that of an outer ring of the second module 12, and an inner ring of the third module 13 has a diameter less than that of an inner ring of the second module 12. Similarly, an outer ring 140 of the fourth module 14 has a diameter more than that of an outer ring of the third module 13, and an inner ring 141 of the fourth module 14 has a diameter less than that of an inner ring of the third module 13. Thus, the first module 11, the second module 12, the third module 13, and the fourth module 14 overlap layer by layer to construct four layers of conducting metal, thereby producing an induction voltage.

In the preferred embodiment of the present invention, the first module 11, the second module 12, the third module 13, and the fourth module 14 are connected serially. In practice, the first module 11 has a first circuit output terminal U1 electrically connected to a first output port U and a second circuit output terminal V1 electrically connected to a first circuit output terminal U2 of the second module 12, the second module 12 has a second circuit output terminal V2 electrically connected to a first circuit output terminal U3 of the third module 13, the third module 13 has a second circuit output terminal V3 electrically connected to a first circuit output terminal U4 of the fourth module 14, and the fourth module 14 has a second circuit output terminal V4 electrically connected to a second output port V. The first circuit output terminal U1 of the first module 11 is mounted on the inner ring 111 of the first module 11. The second circuit output terminal V4 of the fourth module 14 is mounted on the outer ring 140 of the fourth module 14.

In such a manner, the second circuit output terminal V1 of the first module 11 is electrically connected to the first circuit output terminal U2 of the second module 12 by a copper plate, the second circuit output terminal V2 of the second module 12 is electrically connected to the first circuit output terminal U3 of the third module 13 by a copper plate, and the second circuit output terminal V3 of the third module 13 is electrically connected to the first circuit output terminal U4 of the fourth module 14 by a copper plate, so that the first module 11, the second module 12, the third module 13, and the fourth module 14 are connected serially. Thus, the voltage is increased gradually through the first module 11, the second module 12, the third module 13, and the fourth module 14 to construct a secondary-side modularized transformer 1 with a high voltage and a low current.

In the preferred embodiment of the present invention, the annular iron core 10 is made of iron powder, a nanocrystalline, a non-silicon or a silicon steel sheet.

Figure 4:
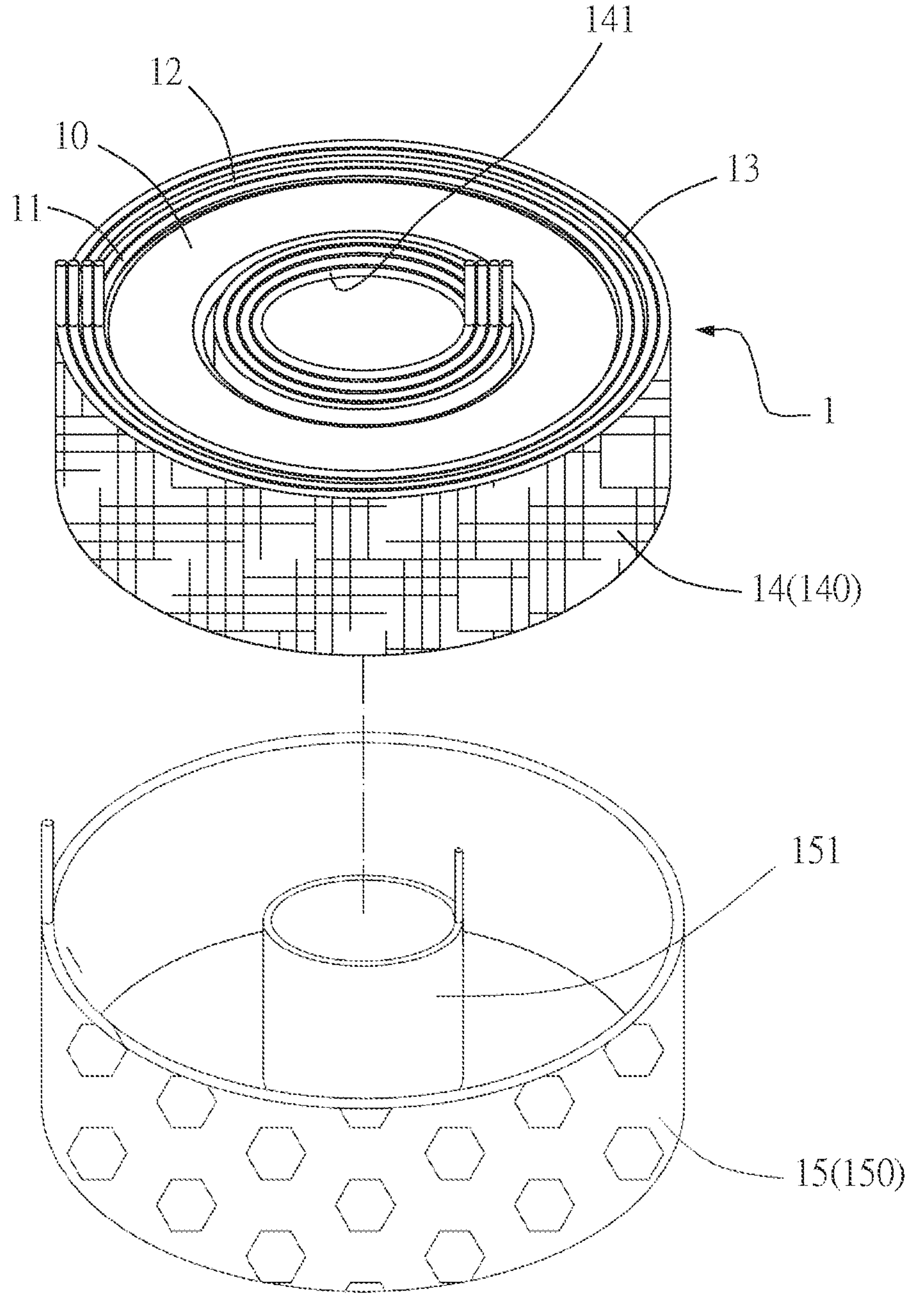
FIG. 4 is a partial exploded perspective view of a modularized transformer in accordance with another preferred embodiment of the present invention.

Referring to FIG. 4 with reference to FIGS. 1-3, the modularized transformer 1 further comprises a fifth module 15 encircling the fourth module 14. The fourth module 14 is placed in the fifth module 15. In practice, an outer ring 150 of the fifth module 15 has a diameter more than that of the outer ring 140 of the fourth module 14, and an inner ring 151 of the fifth module 15 has a diameter less than that of the inner ring 141 of the fourth module 14. Thus, the number of the modules is increased successively to produce a determined voltage or current that satisfies the user's requirement. The fifth module 15 has a small volume to reduce the whole volume of the modularized transformer 1 so that the modularized transformer 1 has a high efficiency with a smaller volume.

Figure 5:
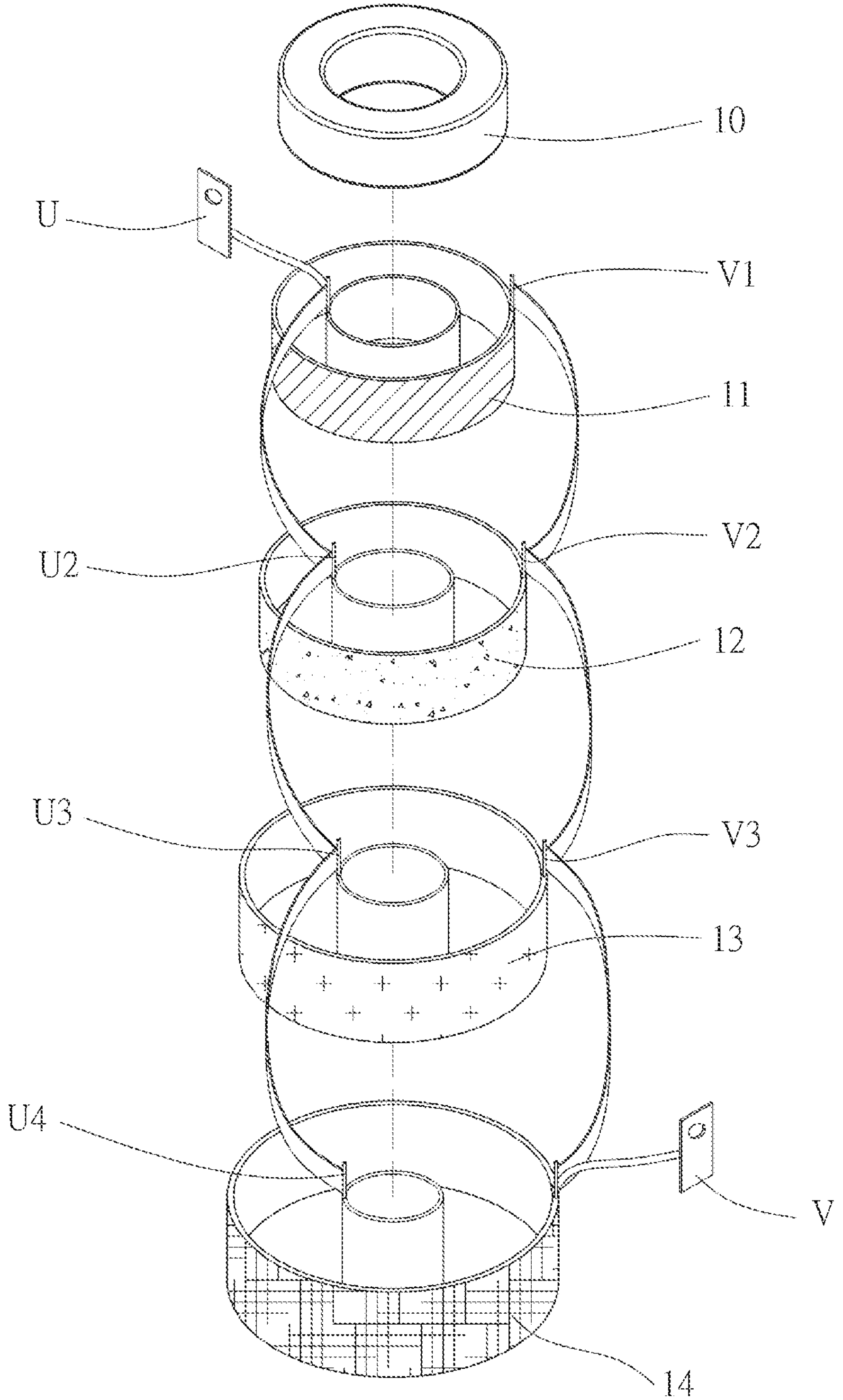
FIG. 5 is an exploded perspective view showing a parallel circuit of the modularized transformer in accordance with the preferred embodiment of the present invention.

Referring to FIG. 5 with reference to FIGS. 1-3, the first module 11, the second module 12, the third module 13, and the fourth module 14 are connected in parallel. In practice, a first output port U, a first circuit output terminal U1 of the first module 11, a first circuit output terminal U2 of the second module 12, a first circuit output terminal U3 of the third module 13, and a first circuit output terminal U4 of the fourth module 14 are electrically connected serially, while a second circuit output terminal V1 of the first module 11, a second circuit output terminal V2 of the second module 12, a second circuit output terminal V3 of the third module 13, a second circuit output terminal V4 of the fourth module 14, and a second output port V are electrically connected serially. Thus, the secondary-side modularized transformer 1 produces a high current and a low voltage.

Accordingly, the modularized transformer 1 has a modularized structure and includes multiple modules that are connected serially or connected in parallel, and the number of the modules is extended and increased to amplify the voltage or current continuously and to regulate the voltage or current at the required value so as to satisfy the requirement of the industry. In addition, the modularized transformer 1 has a smaller volume with a higher efficiency. Further, the modularized transformer 1 has a lower cost of fabrication. Further, the modularized transformer 1 has a great heat radiating system. Further, the modularized transformer 1 is assembled quickly and conveniently to reduce the cost. Further, the modularized transformer 1 has a lighter weight.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A modularized transformer comprising:
an annular iron core;
a first module encircling the annular iron core;
a second module encircling the first module;
a third module encircling the second module;
a fourth module encircling the third module; and
a primary-side power supply line mounted on the fourth module and encircling the annular iron core;
wherein:
the annular iron core is placed in the first module;
the first module is placed in the second module;
the first module is a conducting metal made of copper;
the second module is placed in the third module;
the second module is a conducting metal made of copper;
the third module is placed in the fourth module;
the third module is a conducting metal made of copper;
the fourth module is a conducting metal made of copper;

the primary-side power supply line is winding wire made of copper;

an outer ring of the second module has a diameter more than that of an outer ring of the first module, and an inner ring of the second module has a diameter less than that of an inner ring of the first module;

an outer ring of the third module has a diameter more than that of an outer ring of the second module, and an inner ring of the third module has a diameter less than that of an inner ring of the second module;

an outer ring of the fourth module has a diameter more than that of an outer ring of the third module, and an inner ring of the fourth module has a diameter less than that of an inner ring of the third module.

2. The modularized transformer as claimed in claim 1, wherein:

the first module, the second module, the third module, and the fourth module are connected serially;

the first module has a first circuit output terminal electrically connected to a first output port and a second circuit output terminal electrically connected to a first circuit output terminal of the second module;

the second module has a second circuit output terminal electrically connected to a first circuit output terminal of the third module;

the third module has a second circuit output terminal electrically connected to a first circuit output terminal of the fourth module; and the fourth module has a second circuit output terminal electrically connected to a second output port.

3. The modularized transformer as claimed in claim 1, wherein:

the first module, the second module, the third module, and the fourth module are connected in parallel;

a first output port, a first circuit output terminal of the first module, a first circuit output terminal of the second module, a first circuit output terminal of the third module, and a first circuit output terminal of the fourth module are electrically connected serially; and a second circuit output terminal of the first module, a second circuit output terminal of the second module, a second circuit output terminal of the third module, a second circuit output terminal of the fourth module, and a second output port are electrically connected serially.

4. The modularized transformer as claimed in claim 1, wherein the annular iron core is made of iron powder, a nanocrystalline, a non-silicon or a silicon steel sheet.

5. The modularized transformer as claimed in claim 1, further comprising:

a fifth module encircling the fourth module;

wherein:

the fourth module is placed in the fifth module;

an outer ring of the fifth module has a diameter more than that of the outer ring of the fourth module; and an inner ring of the fifth module has a diameter less than that of the inner ring of the fourth module.

* * * * *